United States Patent [19]

Baustert

[11] Patent Number: 5,705,783
[45] Date of Patent: Jan. 6, 1998

[54] COPPER CORE WELD GUN

[75] Inventor: George N. Baustert, Madison Heights, Mich.

[73] Assignees: Ford Motor Company; Ford Global Technologies, Inc., both of Dearborn, Mich.

[21] Appl. No.: 498,380

[22] Filed: Jul. 5, 1995

[51] Int. Cl.$^6$ .............................. B23K 11/31; B23K 11/36
[52] U.S. Cl. .................... 219/89; 219/86.31; 219/86.8; 219/120
[58] Field of Search ........................ 219/86.25, 86.31, 219/86.8, 89, 120

[56] References Cited

U.S. PATENT DOCUMENTS

| | | | |
|---|---|---|---|
| 1,256,951 | 2/1918 | Thomson | 219/120 |
| 2,067,363 | 1/1937 | Waeschle | 219/89 |
| 2,088,936 | 8/1937 | Henke | 219/120 |
| 2,244,727 | 6/1941 | Rutt | 219/120 |
| 2,400,473 | 5/1946 | Strickland | 218/89 |
| 2,457,606 | 12/1948 | Senn | 219/89 |
| 2,744,989 | 5/1956 | Fagge | 219/89 |
| 2,972,192 | 3/1961 | Plummer | 219/89 |
| 4,114,017 | 9/1978 | Smith | 219/120 |
| 5,099,099 | 3/1992 | Saito | 219/89 |
| 5,173,066 | 12/1992 | Umeda | 219/86.25 |
| 5,412,172 | 5/1995 | Ichikawa et al. | 219/89 |
| 5,530,218 | 6/1996 | Nakamura et al. | 219/86.25 |

FOREIGN PATENT DOCUMENTS

| | | | |
|---|---|---|---|
| 2839472 | 3/1980 | Germany | 219/86.31 |
| 6-218553 | 8/1994 | Japan | 219/86.31 |
| 2189670 | 10/1987 | United Kingdom | 219/86.31 |
| 80/00229 | 2/1980 | WIPO | 219/89 |

*Primary Examiner*—Teresa J. Walberg
*Assistant Examiner*—J. Pelham
*Attorney, Agent, or Firm*—Joseph W. Malleck; Roger L. May

[57] ABSTRACT

A copper core weld gun assembly is provided with a substantially omega ($\Omega$) shaped cross-section taken through each arm of the assembly. Concentric copper tubes are provided to carry cooling water and electric current to the electrodes of each arm. Special fittings are provided to insure that cooling water is carried directly to and from the electrodes without contacting the body, thereby eliminating galvanization in aluminum bodies. The design includes wedge-shaped barrel locks, crown-tipped incoming water tubes, thimble-shaped female electrode caps, and provides modular design capability. A modular gun design separates the gun into three fundamental areas: (a) the electrode system; (b) the body/frame system; and (c) the moment arm design.

10 Claims, 5 Drawing Sheets

5,705,783

COPPER CORE WELD GUN

TECHNICAL FIELD

This invention relates to spot welding guns and, more particularly, to a cast or formed gun with a copper core.

BACKGROUND ART

Resistance welding is an art which has been in existence for over one hundred years. The classic approach has been the use of copper as the fundamental material for manufacturing of the welding gun assembly. This approach provided an acceptable structural design, while also providing the required electrical current to produce the weld. Moreover, the cooling of the electrode tips, as well as the gun assembly itself, required a water path system integral with the gun assembly. This is accomplished by casting small tubes into the arms of the guns, such tubes providing both incoming and outgoing water, the cooling agent.

Present art utilizes this time-proven system. However, copper is a very heavy material, and with the onset of robot applications, such heavy guns were no longer acceptable. To meet the challenge, aluminum was substituted for copper, thus reducing the weight of a typical gun by over 50 percent. However, problems soon arose, such as galvanization. The reaction of aluminum, copper, water and electrical power ultimately destroyed the aluminum housing by means of galvanization.

The solution was to separate the water from the aluminum, and at the same time to provide a pure copper system to conduct the water and the electrical current needed to the electrode tips. The aluminum housing would simply provide the required support and mechanical connections, while the copper core system would provide the electrical and cooling requirements.

Although aluminum is lighter than copper, it is also weaker. Accordingly, it became necessary to address structural integrity problems which were recurring with the new aluminum weld guns. Repeated force application to the aluminum guns causes high bending stresses, and varying workpiece orientation results in significant torsional stresses. Further, directional pressure is required for welding operations, and repeated loading of the weld gun arms often results in a very short usable life span for the guns.

In an attempt to solve structural integrity problems resulting from the use of the aluminum, many cross-sectional configurations have been used for weld gun arms. Some examples include the "I" section, the "T" section, the bar beam, the rectangular welded section, and the double-web welded section. Each of these designs has its advantages for supporting loads applied in certain directions. However, none of the designs referenced above are sufficient to support repeated single-direction loads as well as providing torsional strength. These designs also suffer in their lack of flexibility of form. Furthermore, the side-by-side arrangement of cooling lines does not contribute to the structural integrity of the arms.

The above-referenced problems combine to result in a very short life span for aluminum spot weld guns throughout the welding industry.

SUMMARY OF INVENTION

The present invention solves the above-referenced problems experienced in prior art spot welding assemblies by providing a spot welding gun assembly with a concentrically arranged copper core tube assembly which is secured into each arm of the aluminum body of the gun. The cast aluminum body provides desired flexibility for the process. The assembly forms substantially omega ($\Omega$) shaped cross-sections taken through each arm of the assembly. The omega section provides substantial improvements in torsional and directional strength. Special fittings are provided to ensure that cooling water is carried directly to and from the electrodes without contacting the aluminum body, thereby eliminating corrosion.

Additionally, the present invention provides a modular gun concept, which separates the gun into three fundamental areas: (a) the electrode system; (b) the body/frame system; and (c) the moment arm system. Using this modular design, individual pivot units are provided to cooperate with separate electrodes and separate moment arm systems. The pivot units may comprise a special structural form based upon a triangular design configuration at the central body of the gun which greatly improves structural integrity of the gun.

The present invention contemplates a spot welding gun assembly comprising a cast or formed body, including a pair of arms pivotally mounted with respect to each other. A copper core tube is secured in the respective arm. Copper electrode holders are secured in the respective copper core tubes. Copper electrodes are secured to the respective electrode holders for spot welding a workpiece. The copper electrode holders are adapted for directing water to and from the electrodes for cooling the electrodes, and is further adapted for carrying an electric charge to the electrodes. The spot welding gun assembly forms substantially omega ($\Omega$) shaped cross-sections taken through each of the arms.

The present invention further contemplates a spot welding gun assembly comprising a body, including a pair of arms pivotally mounted with respect to each other. A copper core tube is secured in each of the respective arms. A copper electrode holder is secured within each respective copper core tube. Opposing copper electrodes is secured to the respective electrode holders for spot welding a workpiece. The electrode holders are adapted for directing water to and from the electrodes, and are further adapted for carrying an electric charge to the electrodes. Copper fittings extend from the electrode holders outside the body for carrying water directly to and from the electrode holders without water contacting the body, thereby preventing corrosion of the body.

An object of the present invention is to provide a spot welding gun with increased torsional and directional strength, as well as providing sufficient water fittings to avoid contact of water with the body of the gun to avoid corrosion by providing water directly to the copper core without contacting the body.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 2a shows a cross-sectional view taken at line 4—4 of FIG. 2;

DETAILED DESCRIPTION OF THE PREFERRED EMBODIMENT

Figure 1:
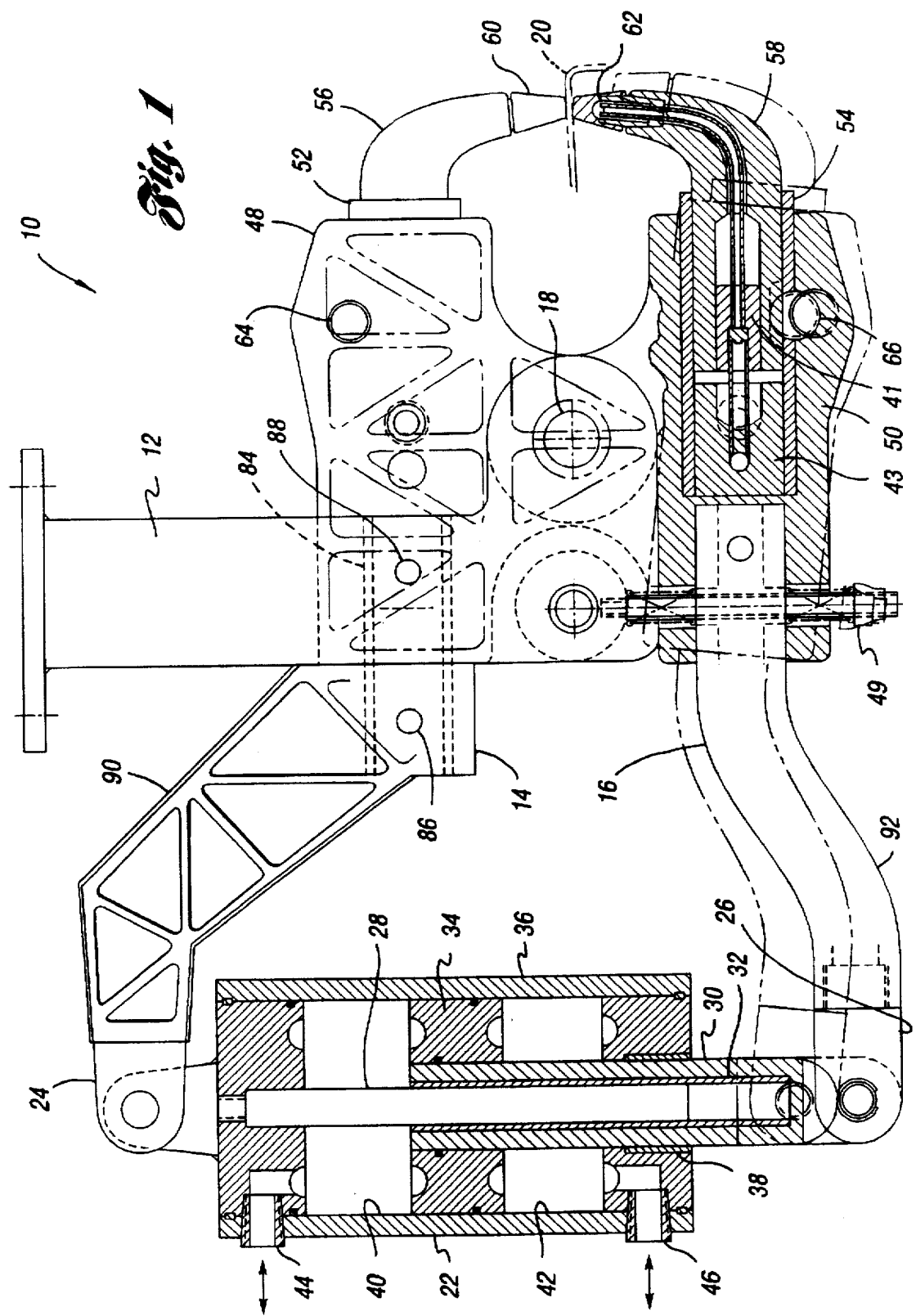
FIG. 1 shows a partially cut away side view of a modular spot welding gun assembly in accordance with the present invention.

FIG. 1 shows a distinct aspect of the present invention which comprises a modular weld gun assembly.

The primary part of the weld gun is the pivotal body which holds the electrodes. This is where the majority of the design and build costs lay. By separating the pivot segment from the moment arm segments, an endless variation of designs is made possible utilizing a minimum of pivot segment variations, which can be standardized in both form and material. The fundamental form offered provides all the requirements in a design which is simple in shape, yet complex in function. The basic shape of the weld gun body is derived from the basic 3-4-5 triangle, which is the foundation of the right triangle theorem. This produces related stress angles that best serve the requirements of the pivot section relative to the electrode and moment arm axis. Equal sections are provided on either side of the central pivot. Violation of this requirement results in breakage of the moment arm segments.

From this starting point, the goal is to select the most appropriate material for the specific application. The use of copper for the electrodes is universally accepted. However, other materials can be used for the body and moment arms. The best material for the moment arms is steel on the basis of strength-to-weight ratio. By using separated moment arms, the body of the gun can be made of other materials, including aluminum, stainless steel, plastic or composite.

The modular design essentially divides the weld gun into three areas of function: (1) the copper electrodes and welding tips; (2) the basic body of the pivot system, which holds both the electrodes and the moment arms; and (3) the moment arms and cylinder attachment. By separating these three functions, the designer is given a much broader basis for designing the best gun to satisfy the unique requirements of the many varying weld situations. Any form of standardization is bound to be limiting, such as the existing use of the pivot bodies and moment arms as combined configurations. Therefore, the modular design provides design flexibility previously unavailable.

Moreover, the entire group of present standard gun chassis is based upon using dry shunts and dry jumper cables. In order to use water cooled jumper cables, an entirely new design concept is required, which leads to the separation of the pivot body and moment arms. Ironically, this results in a potential increase of standardization of the main pivot body of the gun by utilizing a varying angle of pivot body segment relationship to each other. Designs can obtain electrode spacing of from 0" to as much as 24" by utilizing only six basic pivot body segments, three male and three female. The choice of 3", 6", and 9" offsets of the pivot relative to the electrode and moment arm axes makes this possible.

By using plastic or other nonconductive materials for the pivoting body segments, a number of advantages are realized. The plastic bodies will be lighter in weight and include inherent insulating qualities. The plastic bodies will allow precise forming of all areas and features, thus eliminating additional machining costs. Also, lower costs will result from mass production of the plastic bodies, and the designs of the bodies may be simplified without restricting their scope.

The modular weld gun is based upon individual pivot units which accept separate electrodes and separate moment arm systems. Such pivot units are made of any appropriate material, including aluminum, copper, stainless steel, plastic, or any of the composite materials. The design of the pivot unit is to be such that electrical connections and water connections were made directly to the appropriate material designated to carry the electrical current and cooling water. The underlying theme of the construction is to be based upon a central core of copper used to provide the most compatible mating surfaces for the attachment of the electrodes and cooling water connections. The moment arms are attached as separate items. The arms are adaptable to be made of any material which is appropriate, or to be of an appropriate design configuration for the situation.

The structural form of the pivot units is based upon the triangular stress lines that are required to balance the forces of the electrodes with the counterforces of the moment arms, such angles falling within the range of 45°-45°-90° and 30°-60°-90° triangle configurations. The 3-4-5 triangle, which falls within this range, is the preferred configuration and FIG. 1 shows, in phantom, a sample triangle configuration.

Referring specifically to FIG. 1, a modular weld gun assembly is shown in accordance with the present invention. The weld gun assembly 10 includes a mounting bracket 12 for securing the assembly in position in a manufacturing environment. The weld gun assembly 10 further includes a pair of arms 14, 16 pivotally mounted together at the pivot joint 18. The lower pivot arm 16 is pivotally movable to and from the phantom position shown in FIG. 1 to allow entry and exit of a workpiece 20.

The lower arm 16 of the gun assembly 10 is actuated with respect to the upper arm 14 by means of the pneumatic cylinder 22, which is connected to the respective ends 24, 26 of the arms 14, 16. The pneumatic cylinder 22 includes a rod guide 28 which is separated from a hollow piston rod 30 by a liner bushing 32. A piston body 34 moves with the piston rod 30 along the cylinder shell 36. The piston rod 30 moves along a rod bushing 38 of novel application, which supports the piston internally rather than externally in order to alleviate seal wear. Pressurized air selectively enters and exits the first and second chambers 40, 42 through the apertures 44, 46 to push against the piston body 34 and move the piston rod 30, thereby pivoting the lower arm 16 with respect to the upper 14.

The weld gun assembly 10 also includes an arm centering assembly 49 which maintains proper orientation of the arms 14, 16.

Each arm 14, 16 comprises a cast aluminum body 48, 50, which includes a copper core tube 52, 54 secured therein. Each copper core tube 52, 54 includes an electrode holder 56, 58 secured therein for holding the respective electrodes 60, 62. A midway fitting block 41 and an end block 43 are provided within the tube 54 for support. The gun bodies 48, 50 also include barrel locks 64, 66 for preventing rotation of the respective electrode holders 56, 58, and for preventing the electrode holders 56, 58 from disengaging from the bodies 48, 50.

The modular design provides unlimited design capability. For example, as shown in FIG. 1, the copper core tube may be inserted into the body after casting and drilling of the body. A secondary steel tube 84 is inserted into arm 14, and held into place by the dowels 86, 88. FIG. 1 also illustrates alternative rear moment arm portions 90, 92. Rear arm portion 90 is a steel portion extending from the body 48, while rear arm portion 92 is merely a bent pipe extending from the body 50.

Figure 2:
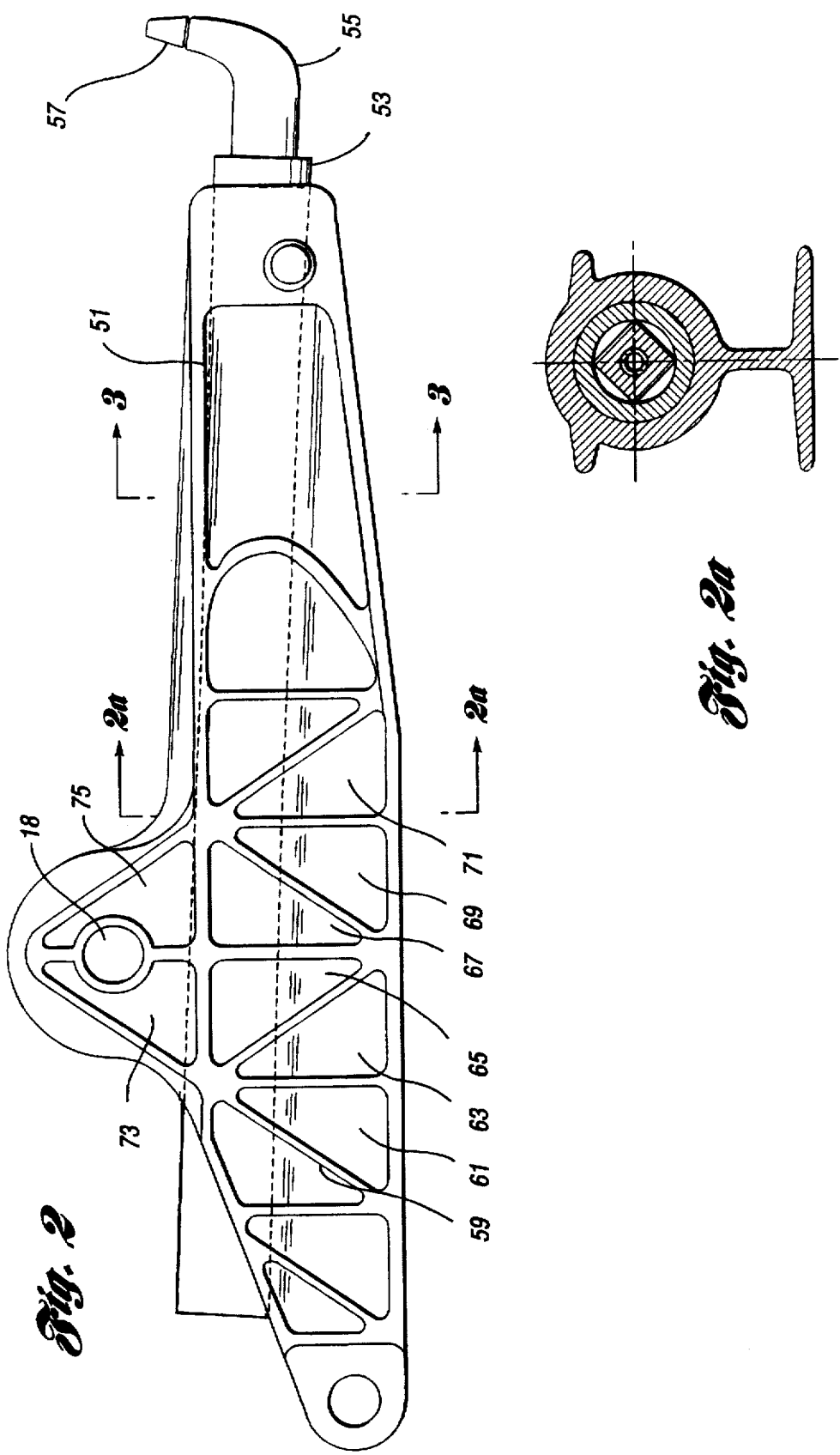
FIG. 2 shows a copper core weld gun arm in accordance with the present invention.

Turning to FIG. 2, a different aspect of the present invention is shown. FIG. 2 shows an omega (Ω) section copper core weld gun arm 51. The arm 51 is pivotally mounted to a second arm at the pivot joint 18. The arm includes a copper tube 53, electrode holder 55, and electrode cap 57. The arm 51 further includes a plurality of ribs 59 extending therefrom to form a high-strength triangular configuration in cooperation with the pivot joint 18. The triangular rib configuration comprises a number of right triangles 61, 63, 65, 67, 69, 71, 73, 75, arranged to optimally dissipate stresses produced by repeated loads placed upon the arm 51 at the electrode cap 57. Breakage at the base of the arm adjacent the pivot joint is a common problem in prior art assemblies. This triangular rib configuration significantly increases the ability of the arm 51 to withstand repeated bending stresses in the area of the pivot joint, and improves the useful life of the arm. This rib configuration also improves feasibility for use of other materials, such as plastics or composites, for the body of the arm in order to minimize weight and maximize strength.

Figures 3, 4:
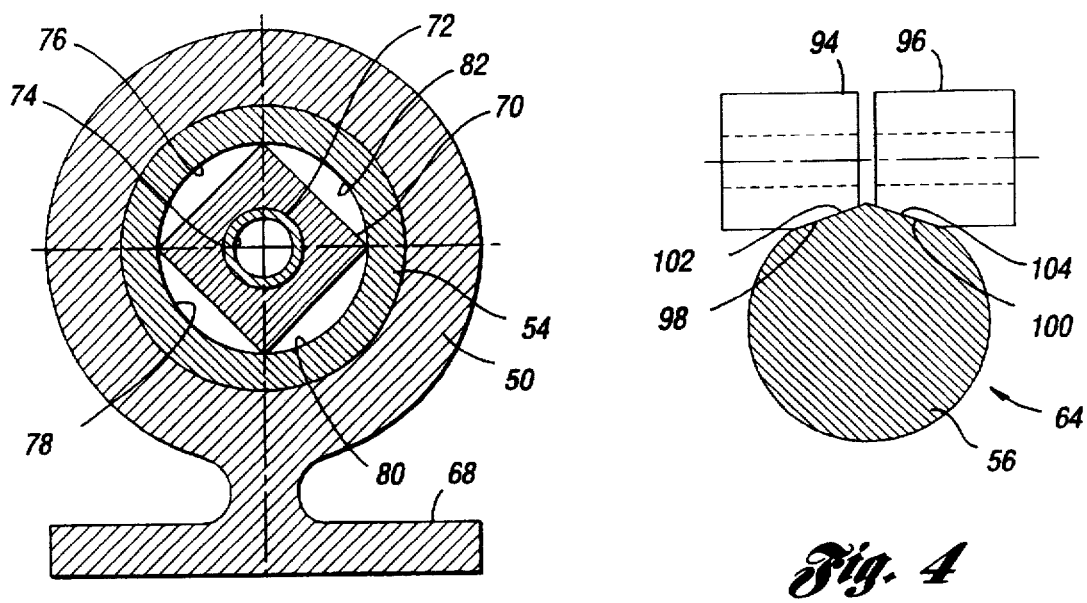
FIG. 3 shows a vertical cross-section taken through line 3—3 of FIG. 2 in accordance with the present invention.
FIG. 4 shows a vertical cross-section of a wedge-shaped electrode lock in accordance with the present invention.

FIG. 3 shows the omega (Ω) section of gun arm 16, as taken through line 3—3 of FIG. 2. The body 50 includes a lower flange 68, which forms the lower portion of the Ω section. The copper pipe 54 is secured within the body 50. An insulating insert 70 is secured within the copper core tube 54, and an incoming water tube 72 is held within the insert 70. The insert 70 is preferably made of an insulating material, such as a foam insulation board. The insulating insert 70 separates the incoming water channel 74 from the outgoing water channels 76, 78, 80, 82, thereby maintaining low temperature for incoming water to the electrodes 60, 62.

A significant feature of this design which results in improved structural integrity is the "centerline" design configuration, whereby the incoming water tube 72, copper core tube 54, and body 50 are all disposed concentrically about a common axis. From this basis, the lower flange 68 is added to complete the omega (Ω) section and to improve torsional rigidity and resistance to bending.

Of course, the omega (Ω) concept is applicable to other styles of weld guns, including the "C" guns and "bell crank" guns. The application of the omega (Ω) section to a "pinch" gun (as disclosed herein) is merely illustrative.

The configuration combining the copper tube with the body adds significant strength to the weld gun assembly because of the substantial strength of the copper in comparison to lighter body materials, such as aluminum.

In order to prevent movement of the electrode holders 56, 58, barrel locks 64, 66 are provided. Barrel lock 64 is shown in cross-section in FIG. 4. Barrel lock 64 comprises a pair of opposing hollow pegs 94, 96. Each peg 94, 96 includes a ramped surface 98, 100, respectively, which corresponds with respective ramped surfaces 102, 104 formed on the electrode holder 56. The opposing pegs 94, 96 with the combination of ramped surfaces 98, 100, 102, 104 prevent rotation of the copper core tube 52 and electrode holder 56, and also prevent the copper core tube 52 and electrode holder 56 from exiting the body 48. Further, the pegs 94, 96 provide positioning surfaces for the electrode holder 56. The pegs 94, 96 may be retightened as required to maintain location of the electrode holder 56.

Figure 5:
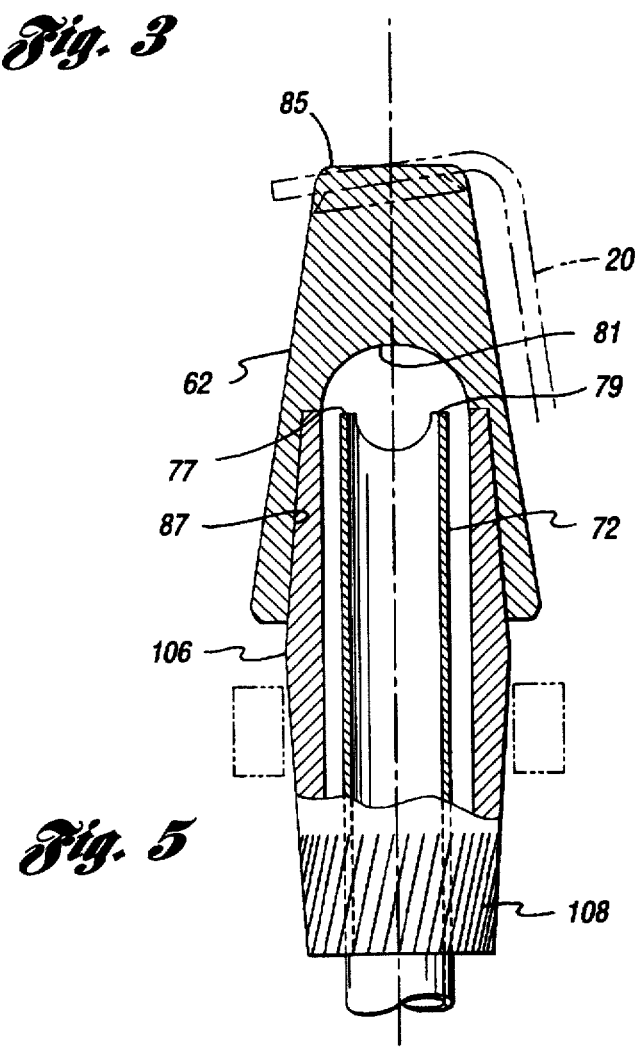
FIG. 5 shows a cut away sectional view of a welding tip in accordance with the present invention.

FIG. 5 shows a partially cut away side view of an electrode cap 62 and adapter 106, with a workpiece 20 shown in phantom. The incoming water tube 72 conveys water directly to the electrode cap 62 to cool the electrode cap. Water then exits the electrode cap area by traveling along the outer surface of the incoming water tube 72. The incoming water tube 72 includes four prongs (prongs 77 and 79 are shown) which form a crown to evenly distribute water against the dome 81 of the electrode cap 62 for cooling. Unlike prior art designs, the prongs 77, 79 do not extend beyond the adapter 106, thereby eliminating the risk of damage to the water tube 72 when the cap 62 is removed.

The cap 62 comprises a novel "thimble"-shaped design which provides a small weld surface 85 at one end and a large water passage and mounting area at the other end. The cap includes a 3° included angle internally at surface 87, as opposed to the 6° angle of prior art caps. The adapter 106 has a 1° draft on its mounting end, which results in an effective press fit, which increases resistance to undesirable pull-off of the adapter 106 during the welding cycle. The opposing end of the adapter 106 comprises a 3° surface to match the adjacent 3° included surface of the cap 62. The adapter 106 also includes serrations 108 formed thereon to help secure the adapter 106 to the electrode holder. The female type design of the cap 62 reduces the tendency which male tips have for enlarging the receiving hole in the electrode. Using the female design, enlarging of the hole occurs at the cap, rather than at the electrode. This is desirable because the cap 62 is designed as a replaceable item, while the electrode is expected to endure.

Figure 6:
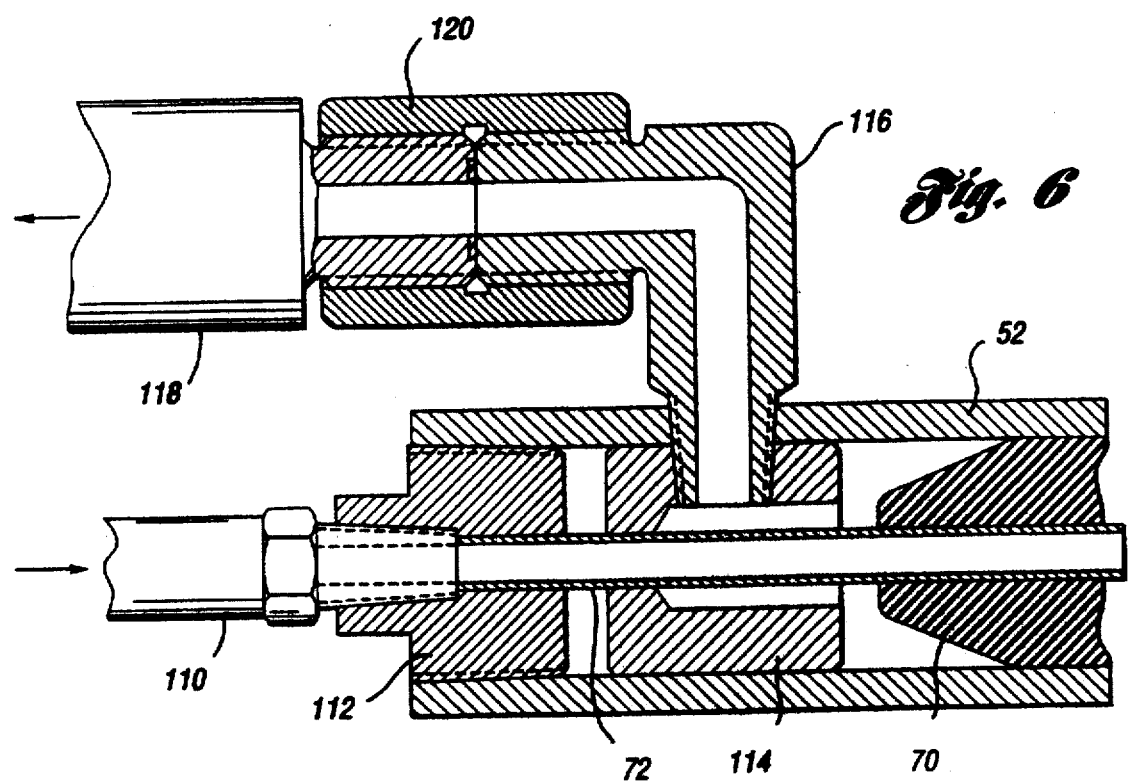
FIG. 6 shows a sectional view of a fitting system for a spot welding gun in accordance with the present invention.

FIG. 6 shows the fitting system for use with the weld gun assembly. The fitting system of the present invention is adapted as both a current carrier and coolant carrier for the respective electrodes 60, 62. In prior art designs, galvanization or corrosion occurs when cooling water contacts both copper and aluminum in the presence of the electric current. This galvanization causes premature failure of the weld gun assembly. The present invention alleviates the problem by providing a copper fitting system as shown in FIG. 6 which provides cooling water directly into the copper core tube 52 without contacting the cast body 48, thereby eliminating galvanization. The fitting system comprises an input 110 which carries water into the incoming water tube 72. The input 110 and incoming water tube 72 are supported by the end fitting 112. Water is carried to the electrode tip through the incoming water tube 72 and returns along the outside of the incoming water tube 72 in channels formed between the insulating insert 70 and the inside wall of the copper core tube 52. The returning water is collected in the fitting block 114 and channelled through the L fitting 116 and through the output 118. The jumper cable 118 is secured to the L fitting 116 by the internally threaded union nut 120. Of course, various multi-piece and single-piece fitting configurations could be used which accomplish the same result of completely avoiding contact of cooling water with the cast body.

In this manner, the copper fitting system moves water toward and away from the electrode tips without contacting the body. The entire fitting assembly, including all of the copper elements, is also used to convey electricity to the electrodes. This novel combined use of the copper fitting system eliminates the need for dry shunts for carrying electric current to the electrodes. Accordingly, minimum sizes must be established to insure required current delivery to the welding electrodes. Standard copper pipe sizes provide the necessary materials, ranging from ¼ inch to 2½ inches outside diameter.

Figure 7:
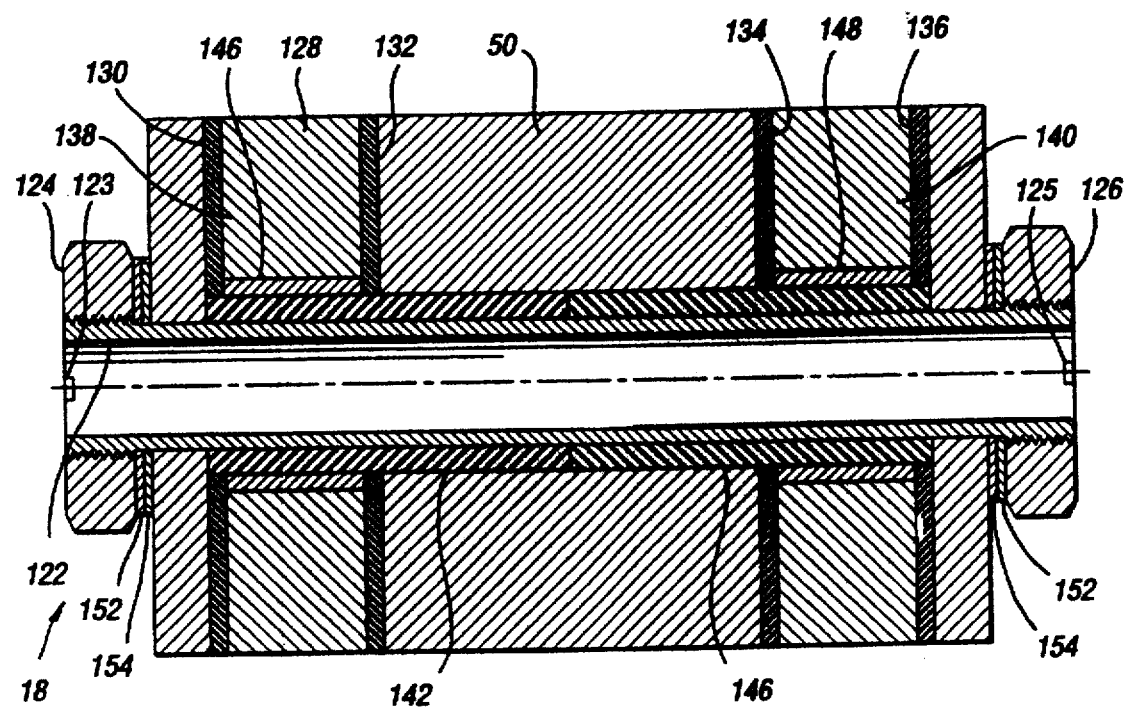
FIG. 7 shows a vertical cross-section of a gun pivot assembly in accordance with the present invention.

Because each arm of the gun assembly acts as an electrode for conducting sufficient amperage to the respective electrode tip, the two bodies must be insulated with respect to each other at the pivot joint 18, as shown in FIG. 7. The insulated pivot joint 18 comprises a clevis pin 122, which is externally threaded at each end to receive castellated nuts 124, 126. The clevis 128 of the body 48 is separated from the body 50 by means of a series of insulation segments. Insulating discs 130, 132, 134, 136 are provided along the sides of the clevis arms 138, 140 for insulation therebetween. A pair of insulating sleeves 142, 144 is provided concentrically around the clevis pin 122, and stainless steel bushings 146, 148 are provided to prevent wear between each clevis arm 138, 140 and the respective insulating sleeve 142, 144. Cone-shaped spring washers 152, 154, known by the trade name "Belville" washers, are held by the nuts 124, 126 to provide constant pressure upon the mating members of the pivot joint 18 to compensate for wear. Cotter pins extend through the apertures 123, 125 to secure the nuts 124, 126.

Figure 8:
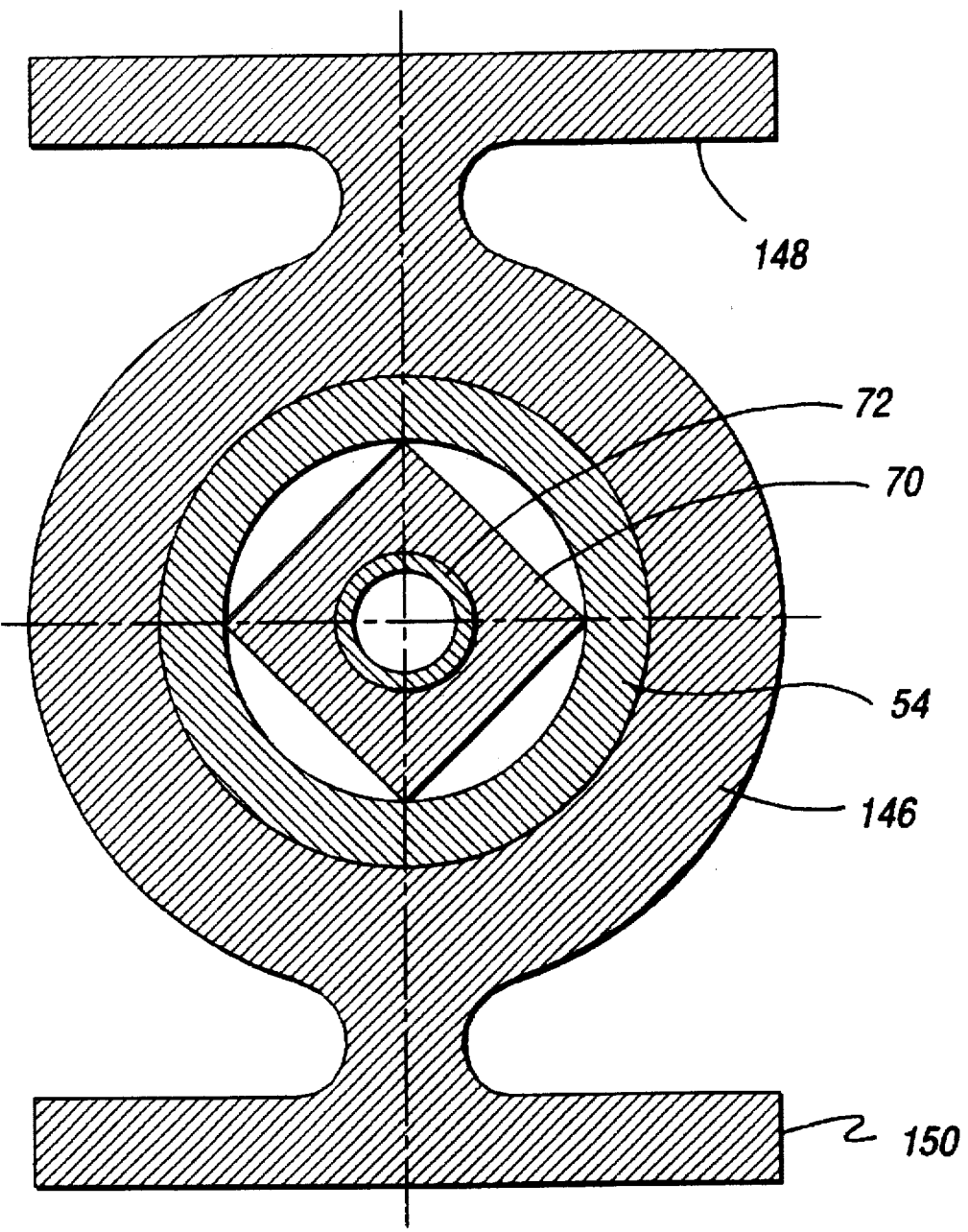
FIG. 8 shows an alternative cross-section of an arm of a weld gun which would be taken along line 3—3 of FIG. 2 in accordance with the present invention.

An alternative embodiment of the omega (Ω) section is shown in FIG. 8. The alternative embodiment includes a central body portion 146 with a pair of opposing flanges 148, 150 extending therefrom. This embodiment provides additional resistance to bending in comparison to the Ω section.

While the best mode for carrying out the invention has been described in detail, those familiar with the art to which this invention relates will recognize various alternative designs and embodiments for practicing the invention. Thus, the above-described preferred embodiment is intended to be illustrative of the invention which may be modified within the scope and spirit of the following appended claims.

What is claimed is:

1. A spot welding gun assembly, comprising:

a body, including a pair of arms pivotally mounted with respect to each other;

a pair of copper core tubes secured into the respective arms along first and second axes;

a pair of copper electrode holders secured in the respective copper core tubes;

a pair of copper electrode caps secured with respect to the respective electrode holders for spot welding a workpiece and each having a substantially dome-shaped interior cavity;

a pair of hollow adapters secured to the respective electrode holders for securing the respective cap thereto;

said pair of copper electrode holders adapted for directing water to and from the electrode caps for cooling the electrode caps, and further adapted for carrying an electric charge to the electrode caps;

wherein said copper electrode holders and adapters have a deflector tube extending therethrough for carrying water to the interior cavity of the respective electrode cap, said deflector tubes including a plurality of prongs forming a crown shape on the distal end thereof for evenly distributing water flow into the respective dome-shaped cavity, and wherein said prongs do not extend beyond the respective adapter.

2. The spot welding gun assembly of claim 1, further comprising a plurality of copper fittings extending from said deflector tube and conduits beyond the body for carrying water to and from the conduits, thereby avoiding contact of water with the body in order to prevent corrosion of the body.

3. The spot welding gun assembly of claim 1, wherein said body comprises aluminum.

4. The spot welding gun assembly of claim 1, further comprises a flat surface formed on said electrode holder and a barrel lock extending into the body and having a wedge surface formed on the barrel lock for cooperation with said flat surface to prevent rotation of said electrode holder with respect to said body.

5. The spot welding gun assembly of claim 1, further comprising a midway fitting block positioned within each said copper core tube for supporting the respective deflector tube.

6. A spot welding gun assembly, comprising:

a body, including a pair of arms pivotally mounted with respect to each other;

a pair of copper core tubes secured into the respective arms along first and second axes;

a pair of copper electrode holders secured in the respective copper tubes;

a pair of opposing copper electrode caps secured with respect to the respective electrode holders for spot welding a workpiece and each having a substantially dome-shaped interior cavity;

a pair of hollow adapters secured to the respective electrode holders for securing the respective cap thereto;

said pair of electrode holders adapted for directing water to and from the electrode caps, and further adapted for carrying an electric charge to the electrode caps;

a plurality of copper fittings extending from said electrode holders outside the body for carrying water directly to and from the electrode holders while avoiding contact of water with the body, thereby preventing corrosion of the body; and wherein said copper electrode holders and adapters have a deflector tube extending therethrough for carrying water to the interior cavity of the respective electrode cap, said deflector tubes including a plurality of prongs forming a crown shape on the distal end thereof for evenly distributing water flow into the respective dome-shaped cavity, and wherein said prongs do not extend beyond the respective adapter.

7. The spot welding gun assembly of claim 6, wherein said body comprises aluminum.

8. The spot welding gun assembly of claim 6, further comprising a flat surface formed on said electrode holder and a barrel lock extending into the body and having a wedge surface formed on the barrel lock for cooperation with said flat surface to prevent rotation of said electrode holder with respect to said body.

9. The spot welding gun assembly of claim 6, further comprising a midway fitting block positioned with each said copper core tube for supporting the respective deflector tube.

10. The spot welding gun assembly of claim 6, wherein said assembly forms substantially omega (Ω) shaped cross-sections taken through each of said arms perpendicular to said first and second axes.

* * * * *